(12) United States Patent
Rothaar et al.

(10) Patent No.: US 8,861,058 B2
(45) Date of Patent: Oct. 14, 2014

(54) SCANNING PROJECTOR WITH NON-RECTANGULAR DISPLAY

(75) Inventors: Bruce C. Rothaar, Woodinville, WA (US); Joel Sandgathe, Portland, OR (US)

(73) Assignee: Microvision, Inc., Redmond, WA (US)

( * ) Notice: Subject to any disclaimer, the term of this patent is extended or adjusted under 35 U.S.C. 154(b) by 226 days.

(21) Appl. No.: 13/295,841

(22) Filed: Nov. 14, 2011

(65) Prior Publication Data

US 2013/0120819 A1 May 16, 2013

(51) Int. Cl.
*G02B 26/10* (2006.01)
*H04N 9/31* (2006.01)
*G02B 26/08* (2006.01)
*G02B 27/01* (2006.01)

(52) U.S. Cl.
CPC ............ *H04N 9/3135* (2013.01); *G02B 26/085* (2013.01); *G02B 27/017* (2013.01); *H04N 9/3185* (2013.01)
USPC ....................... 359/199.1; 359/224.1; 345/208

(58) Field of Classification Search
USPC .......... 359/198.1–199.4, 200.6–200.8, 202.1, 359/221.2, 223.1–225.1, 226.2, 904, 359/290–295, 838, 846, 871, 872; 250/204, 250/559.06, 559.29, 230, 234; 347/255–260; 353/39, 98–99; 385/15–18, 22; 398/12, 19, 45
See application file for complete search history.

(56) References Cited

U.S. PATENT DOCUMENTS

| | | | |
|---|---|---|---|
| 7,492,495 B2 * | 2/2009 | Ishihara et al. ............. | 359/202.1 |
| 2010/0079836 A1 * | 4/2010 | Rothaar ...................... | 359/223.1 |
| 2010/0315552 A1 * | 12/2010 | Rothaar et al. ................ | 348/512 |
| 2011/0013097 A1 * | 1/2011 | Freeman et al. .............. | 348/745 |

* cited by examiner

*Primary Examiner* — Stephone B Allen
*Assistant Examiner* — James McGee
(74) *Attorney, Agent, or Firm* — Kevin D. Wills

(57) ABSTRACT

A scanning beam projection system includes a scanning mirror having a fast-scan axis and a slow-scan axis. Movement on the fast-scan axis is controlled by a fast-scan scanning mirror control system. The control system receives position information describing angular displacement of the mirror. A fast-scan drive signal is generated that causes the scanning mirror to oscillate at a resonant frequency with a varying amplitude.

12 Claims, 16 Drawing Sheets

US 8,861,058 B2

SCANNING PROJECTOR WITH NON-RECTANGULAR DISPLAY

FIELD

The present invention relates generally to scanning beam display systems, and more specifically to controlling the deflection of scanning mirrors in scanning beam display systems.

BACKGROUND

Scanned light beams are used to produce display images for a wide variety of applications, including such applications as mobile microprojectors, automotive head-up displays, and head-worn displays. The displays are created by using the angular motion of a mirror to deflect a modulated light beam to cover the desired field of view. By moving the mirror about two orthogonal axes, a rectangular field of view can be created, providing the familiar look of a raster display in a compact and portable package.

Controlling the mirror deflection to correctly produce the desired angular motion presents a significant engineering challenge.

DESCRIPTION OF EMBODIMENTS

Figure 1:
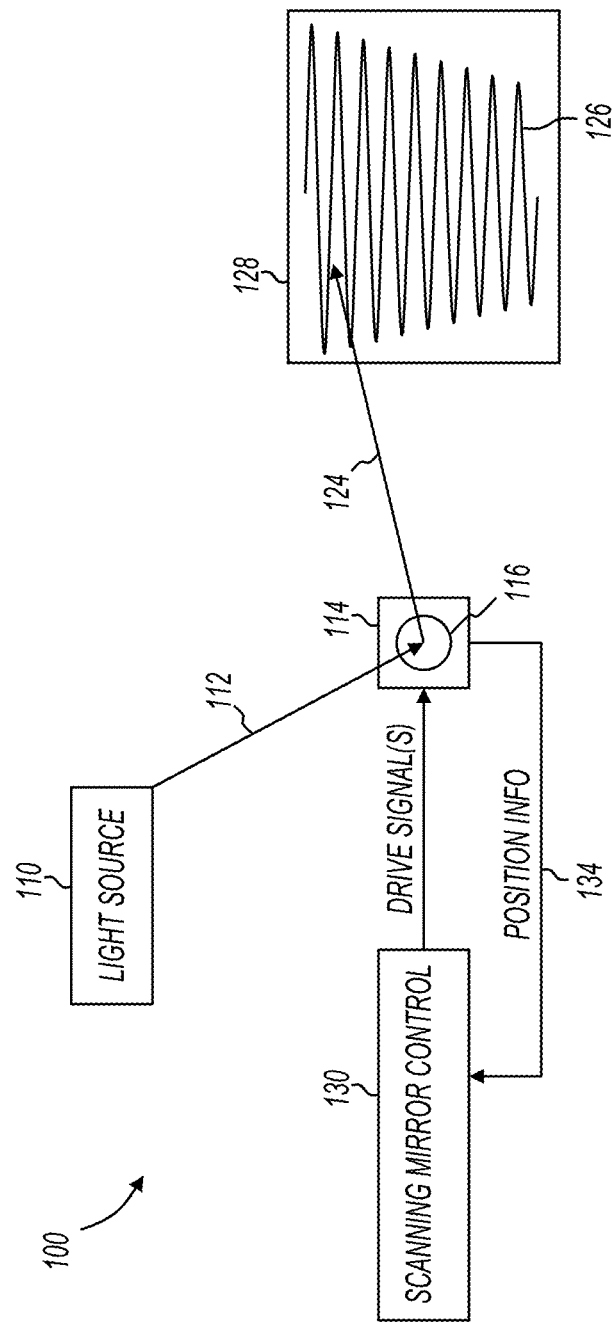
FIG. 1 shows a scanned beam projection system in accordance with various embodiments of the present invention.

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments without departing from the scope of the invention. In addition, it is to be understood that the location or arrangement of individual elements within each disclosed embodiment may be modified without departing from the scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

FIG. 1 shows a scanned beam projection system in accordance with various embodiments of the present invention. As shown in FIG. 1, scanned beam projection system 100 includes a light source 110, which may be a laser light source such as a laser diode or the like, capable of emitting a beam 112 which may be a laser beam. The beam 112 impinges on a scanning platform 114 which includes a microelectromechanical system (MEMS) based scanner or the like, and reflects off of scanning mirror 116 to generate a controlled output beam 124. A scanning mirror control circuit 130 provides one or more drive signal(s) to control the angular motion of scanning mirror 116 to cause output beam 124 to generate a raster scan 126 on a projection surface 128.

In some embodiments, raster scan 126 is formed by combining a sinusoidal component on the fast-scan axis (horizontal axis) and a sawtooth component on the slow-scan axis (vertical axis). In these embodiments, controlled output beam 124 sweeps back and forth left-to-right in a sinusoidal pattern, and sweeps vertically (top-to-bottom) in a sawtooth pattern with the display blanked during flyback (bottom-to-top). FIG. 1 shows the fast-scan sinusoidal pattern as the beam sweeps vertically top-to-bottom, but does not show the flyback from bottom-to-top.

In some embodiments, the sinusoidal component on the fast-scan axis has a non-uniform amplitude. For example, as shown in FIG. 1, as the controlled output beam 124 sweeps vertically, the amplitude on the fast-scan axis changes. The fast-scan amplitude may change substantially linearly for a period of time as shown in FIG. 1, or may change in any manner, including non-linearly. The varying fast-scan amplitude results in a non-rectangular display shape. For example, when the amplitude changes linearly as shown in FIG. 1, the shape of the resulting display is trapezoidal. This may be useful to pre-distort an image to match an angular projection surface 128; for example, when projection system 100 is mounted on a ceiling and projecting on a wall.

Scanning mirror 116 is deflected according to signals provided by scanning mirror control circuit 130, and mirror position information is provided back to scanning mirror control circuit 130 at 134. The mirror position information may describe angular position in the vertical slow-scan direction, the horizontal fast-scan direction, or both. Scanning mirror control circuit 130 receives the position information, determines the appropriate drive signals, and drives scanning mirror 116.

Figure 2:
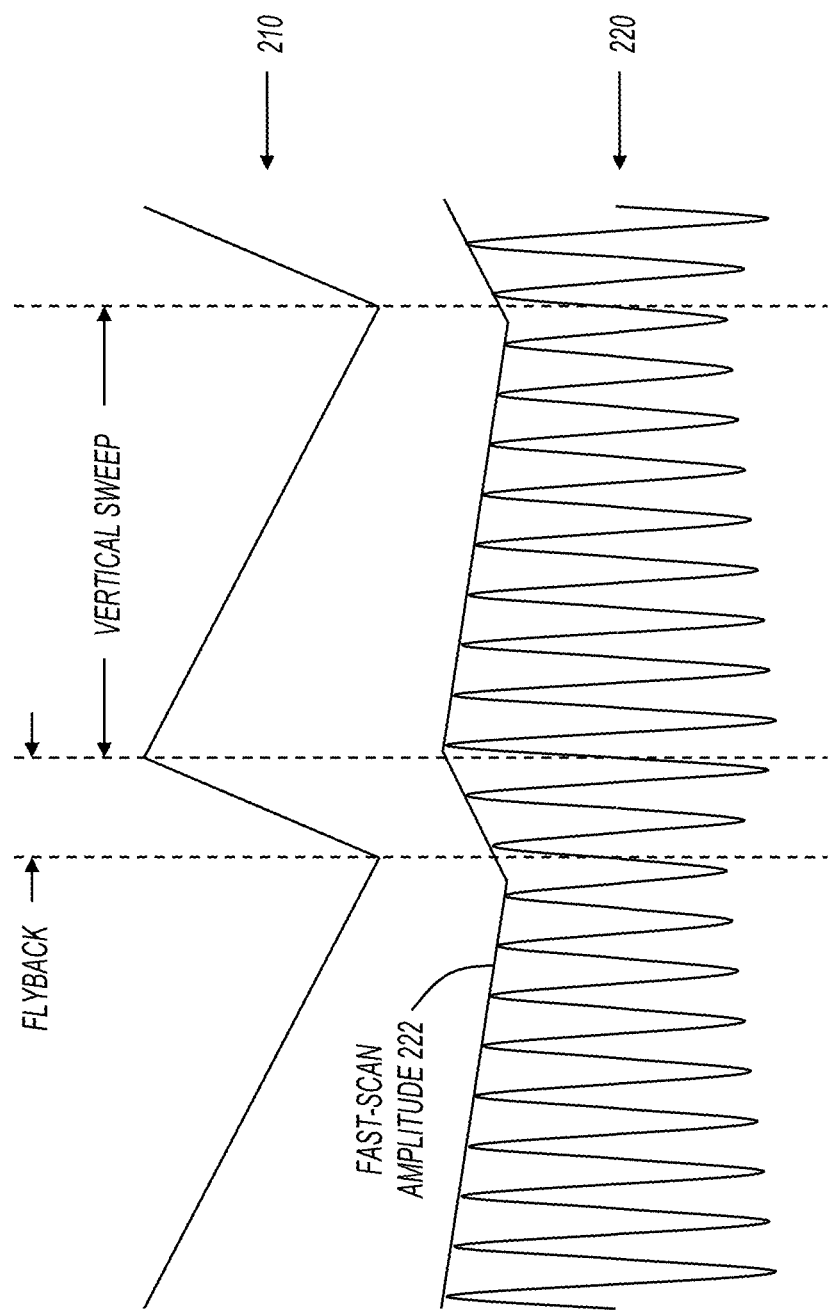
FIG. 2 shows beam deflection waveforms that result in the scan trajectory of FIG. 1.

FIG. 2 shows beam deflection waveforms that result in the raster scan trajectory of FIG. 1. Vertical deflection waveform 210 is a sawtooth waveform, and horizontal deflection waveform 220 is a sinusoidal waveform. The sawtooth vertical deflection waveform 210 includes a falling portion corresponding to the sweep of raster scan 126 from top-to-bottom, and also includes a rising portion corresponding to the flyback from bottom-to-top. After the flyback, the vertical sweep traverses substantially the same path on each trajectory.

The amplitude 222 of the fast-scan deflection waveform 220 is shown linearly decreasing during each vertical sweep. This results in the trapezoidal display shape shown in FIG. 1. Amplitude 222 varies for a finite time period during each slow-scan sweep, and then repeats. The fundamental frequency of the fast-scan amplitude variations is the same as vertical deflection waveform 210. For example, in systems that retrace on the slow-scan axis at 60 Hz, the fundamental frequency of amplitude signal 222 is also 60 Hz.

It is important to note that the waveforms of FIG. 2 represent the desired mirror deflection as opposed to the drive signals provided to the scanning mirror. If the scanning mirror had a perfectly flat natural response with no resonance, scanning mirror control circuit 130 could drive signals 210 and 220 as shown. In actual implementations, scanning mirror 116 has resonant characteristics with multiple distinct vibration modes. Scanning mirror control circuit 130 modifies the drive signals in an attempt to cause the scanning mirror 116 to deflect according to the waveforms shown in FIG. 2 and thereby sweep controlled beam 124 to generate raster scan 126.

For ease of illustration, FIGS. 1 and 2 show a relatively small number of fast-scan cycles for each slow-scan cycle. In some embodiments, a significantly larger number of fast-scan cycles exist for each slow-scan cycle. For example, the slow-scan sweep may operate near 60 Hz and the fast-scan sweep may operate upwards of 18 kHz. One skilled in the art will appreciate that the various embodiments of the present invention may be advantageously applied to any scanning system regardless of the relationship between slow and fast-scan frequencies.

Although FIGS. 1 and 2 show a sawtooth waveform for the slow-scan deflection, the various embodiments of the invention are not so limited. For example, the slow-scan deflection waveform may be triangular, limited harmonic sinusoidal, or any other shape, without departing from the scope of the present invention.

Figure 3:
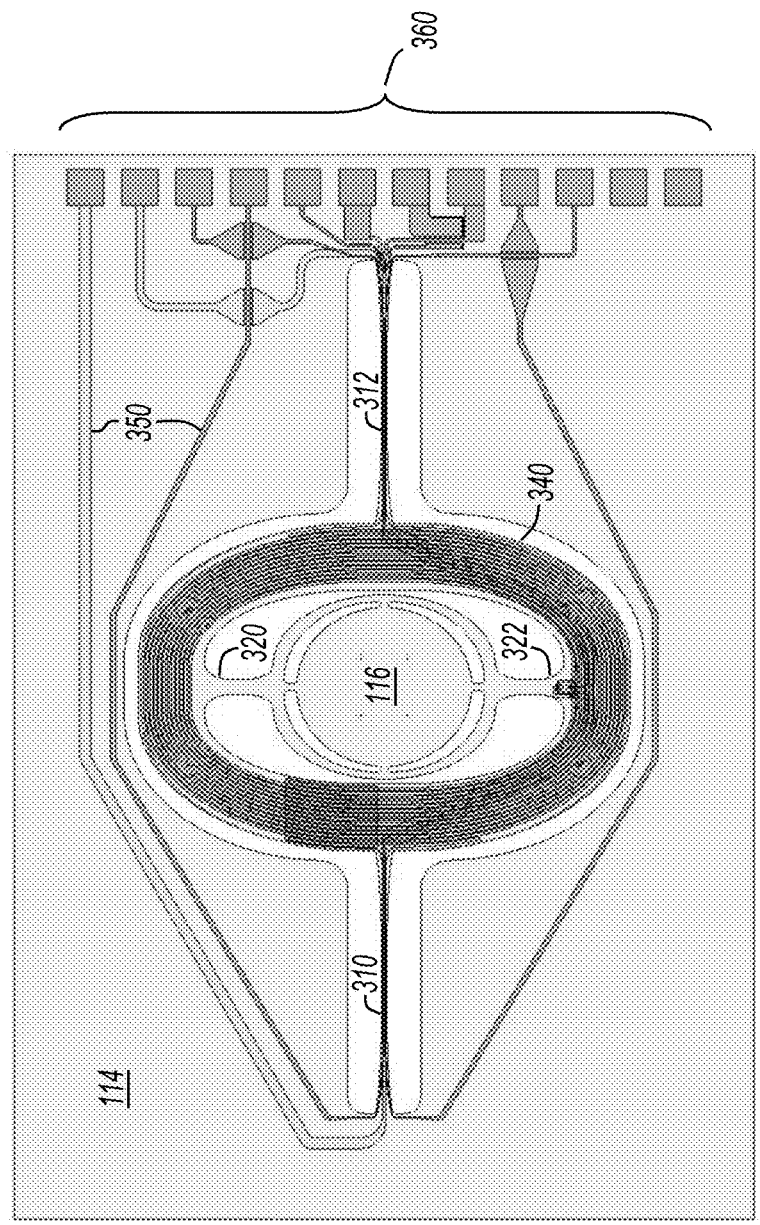
FIG. 3 shows a plan view of a scanning platform with a microelectromechanical system (MEMS) scanning mirror.

FIG. 3 shows a plan view of a scanning platform with a microelectromechanical system (MEMS) scanning mirror. Scanning platform 114 includes gimbal 340 and scanning mirror 116. Gimbal 340 is coupled to scanning platform 114 by flexures 310 and 312, and scanning mirror 116 is coupled to gimbal 340 by flexures 320 and 322. Gimbal 340 has a drive coil connected to drive lines 350. Current driven into drive lines 350 produces a current in the drive coil. Scanning platform 114 also incorporates one or more integrated piezoresistive position sensors. In some embodiments, scanning platform 114 includes one position sensor for each axis. Two of the interconnects 360 are coupled to drive lines 350. The remaining interconnects provide for the integrated position sensors for each axis.

In operation, an external magnetic field source (not shown) imposes a magnetic field on the drive coil. The magnetic field imposed on the drive coil by the external magnetic field source has a component in the plane of the coil, and is oriented at roughly 45° with respect to the two drive axes. The in-plane current in the coil windings interacts with the in-plane magnetic field to produce out-of-plane Lorentz forces on the conductors. Since the drive current forms a loop on gimbal 340, the current reverses sign across the scan axes. This means the Lorentz forces also reverse sign across the scan axes, resulting in a torque in the plane of and normal to the magnetic field. This combined torque produces responses in the two scan directions depending on the frequency content of the torque.

The frequency components of the applied torque are selected to excite the horizontal mirror resonance with a varying amplitude (~18 kHz+/−60 Hz, 120 Hz, 180 Hz . . . ) and to provide a ramp drive for the vertical mirror motion (60 Hz, 120 Hz, 180 Hz . . . ). The frequency response characteristics of mirror 116 and gimbal 340 act to separate the torque components into their respective motions.

The frequencies of the various resonant modes may vary based on selected design criteria. For example, the frequency of the dominant resonant mode on the fast-scan axis may be increased or decreased by modifying the inertial mass of scanning mirror 116, or by varying properties of flexures 310 and 312. Likewise, the frequency of the dominant resonant mode on the slow-scan axis may be increased or decreased by modifying the properties of flexures 320 and 322, or by modifying the inertial mass of gimbal 340 and scanning mirror 116. An example MEMS mirror with different resonant characteristics is described in Randall B. Sprague et al., *Bi-axial Magnetic Drive for Scanned Beam Display Mirrors*, Proc. SPIE, Vol. 5721, 1 (Jan. 24, 2005); DOI:10.1117/12.596942 Online Publication Date: 28 Feb. 2005. One skilled in art will appreciate that any scanning mirror with any resonant properties may be utilized with the various embodiments of the present invention.

The scanning mirror shown in FIG. 3 is an example of a "coil driven mirror", and more specifically, a "moving coil" design, because the coil moves in the presence of a magnetic field. In other embodiments, the mirror has one or more fixed magnets attached thereto, and the coil is stationary. In still further embodiments, other types of drive mechanisms are utilized (e.g., capacitively driven MEMS mirrors). The type of drive mechanism used to cause mirror motion is not a limitation of the present invention.

Scanning platform 114 is an example of a scanning mirror assembly that scans light in two dimensions. In some embodiments the scanning mirror assembly includes a single mirror that scans in two dimensions (e.g., on two axes). Alternatively, in some embodiments, scanning platform 114 may be an assembly that includes two scan mirrors, one which deflects the beam along one axis, and another which deflects the beam along a second axis largely perpendicular to the first axis. Either the first or second scan mirror may be the fast-scan mirror or the slow-scan mirror.

Various embodiments of the present invention provide a feedback loop that modifies the scanning mirror drive signals to produce the desired scanning mirror behavior in the presence of high mechanical gain and non-linear characteristics that produce additional motion distortion. In some embodiments, the amplitude and phase of each of the harmonic drive signals is modified in response to the measured behavior of the mirror. Further, each harmonic signal may be modified at a different rate (the "learning rate"). For example, harmonic signals in regions of high mechanical gain may be modified more slowly (have lower learning rates) than harmonic signals in regions of low mechanical gain.

Figure 4:
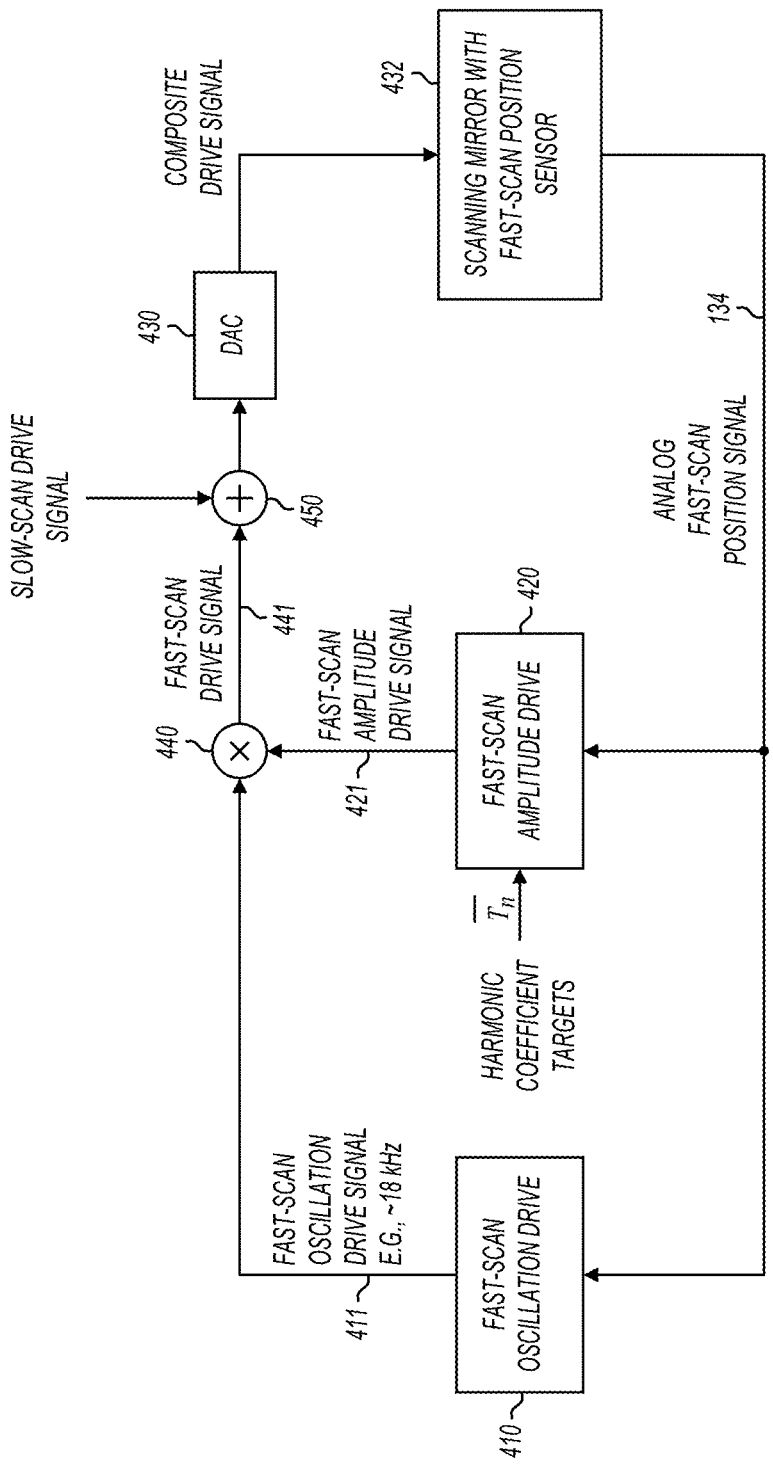
FIG. 4 shows a scanning mirror fast-scan control loop with a fast-scan amplitude drive circuit.

FIG. 4 shows a scanning mirror fast-scan control loop with a fast-scan amplitude drive circuit. The fast-scan control loop includes fast-scan oscillation drive circuit 410, fast-scan amplitude drive circuit 420, multiplier 440, summer 450, and digital-to-analog converter 430. Scanning mirror 432 may be any scanning mirror that senses and provides an analog fast-scan position signal, including the examples described above with reference to FIG. 3. The remaining components depicted in FIG. 4 represent a scanning mirror control circuit, such as scanning mirror control circuit 130 (FIG. 1).

Scanning mirror 432 includes position sensors in the fast-scan direction. These sensors provide a signal that corresponds to the actual angular displacement of the mirror in the fast-scan direction. The analog fast-scan position signal is provided from the sensors to other circuits on node 134. Scanning mirror 432 may be any suitable scanning mirror implementation, including a single axis scanning mirror or a dual axis scanning mirror.

In operation, fast-scan oscillation drive circuit 410 receives the analog fast-scan position signal on node 134 and produces a digital signal to excite a resonant mode of scanning mirror 432 on the fast-scan axis. In some embodiments, this corresponds to generating a digital fast-scan oscillation drive signal at substantially 18 kHz with a substantially constant amplitude. Fast-scan amplitude drive circuit 420 receives the analog fast-scan position signal on node 134 and produces a digital signal that modifies the amplitude of the sinusoidal oscillation of the scanning mirror as a function of time. The fast-scan oscillation drive signal on node 411 and the fast-scan amplitude drive signal on node 421 are multiplied together by multiplier 440 to produce the complete fast-scan drive signal on node 441. In single two-axis mirror embodiments, the fast-scan drive signal on node 441 is summed with a slow-scan drive signal by summer 450 prior to being converted to an analog drive signal by digital-to-analog converter 430 to drive scanning mirror 432. In single axis mirror embodiments, summer 450 is omitted.

As described in more detail below, various embodiments of fast-scan amplitude drive circuit 420 generate and sum digital harmonically related time domain signals to create the digital fast-scan amplitude drive signal. Fast scan amplitude drive circuit 420 adaptively modifies the digital harmonically related time domain signals until the amplitude of the fast-scan position signal matches a time-domain waveform specified by harmonic coefficient targets specified as:

$$T_n = T_R + iT_I, \quad (1)$$

where n is the harmonic number, $T_n$ is complex, $T_R$ is the real, and $iT_I$ is imaginary.

Figure 5:
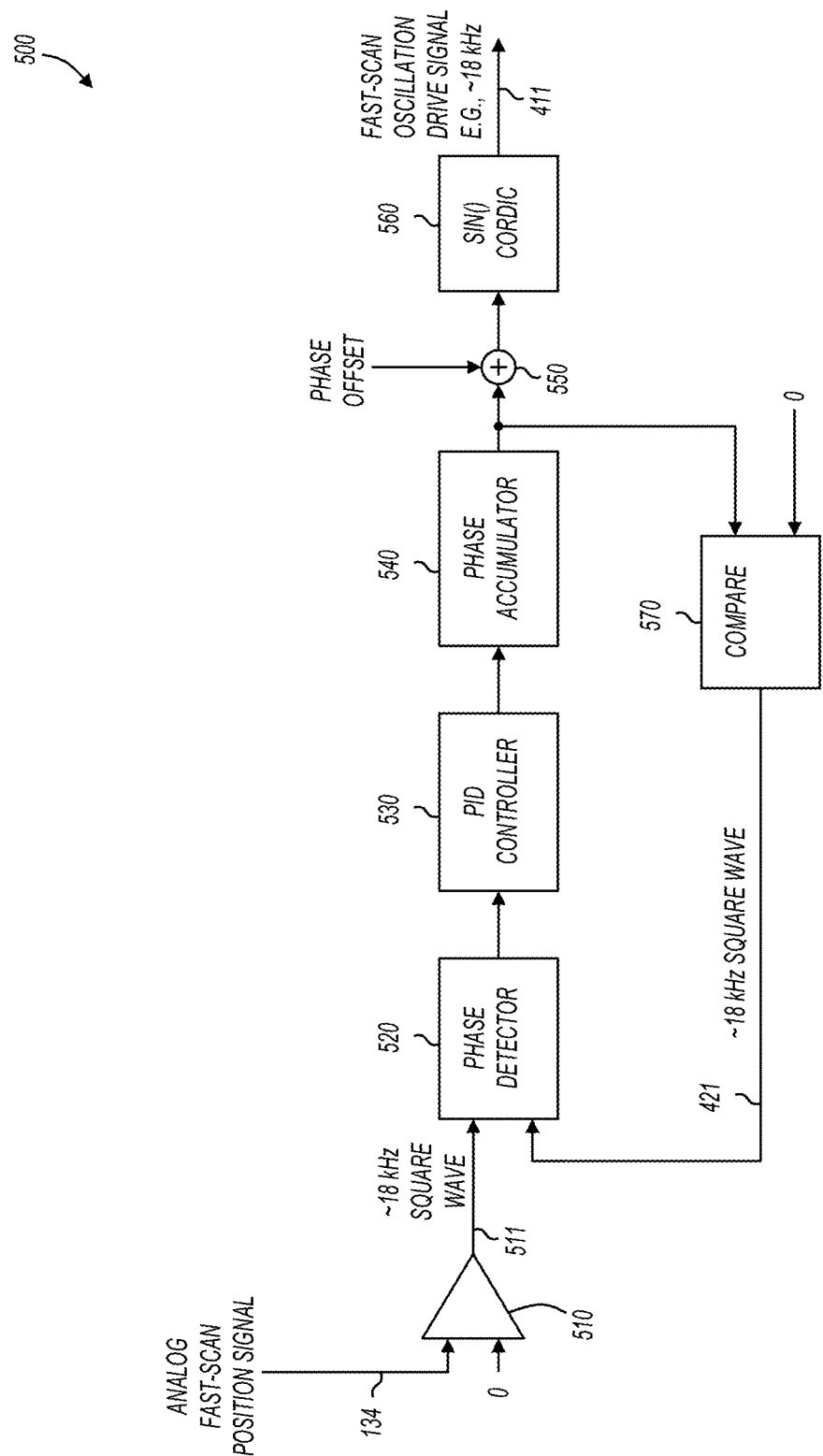
FIG. 5 shows a fast-scan oscillation drive circuit.

FIG. 5 shows a fast-scan oscillation drive circuit. Fast-scan oscillation drive circuit 500 is an example circuit that may perform the function of fast-scan oscillation drive circuit 410 (FIG. 4). Fast-scan oscillation drive circuit 500 includes analog comparator 510, phase detector 520, proportional/integral/derivative (PID) controller 530, phase accumulator 540, digital comparator 570, summer 550, and sin wave generator 560.

In operation, analog comparator 510 compares the analog fast-scan position signal with a static value, shown as "0" in FIG. 5. If the analog fast-scan position signal varies positive and negative, then the comparison value may be electrical ground. Any offset may be applied within analog comparator 510 without departing from the scope of the present invention. The output of analog comparator 510 is a square wave at the fast-scan oscillation frequency, which in this example is shown as 18 kHz.

Phase detector 520 compares the output of analog comparator 510 with the output of digital comparator 570, and produces an error signal that is presented to PID controller 530. PID controller 530 functions as a loop filter to modify the phase increment that is accumulated by phase accumulator 540 as a function of the error signal. The various embodiments of the present invention are not limited to the use of PID controllers. Any suitable loop filter may be employed.

Digital comparator 570 compares the output of phase accumulator 540 with a static value to create a square wave at the same frequency as the fast-scan position signal, which in this example is 18 kHz. The static comparison value is shown as "0", which corresponds to phase accumulator 540 accumulating phase between negative 180 degrees and positive 180 degrees. One skilled in the art will appreciate that any phase offset within phase accumulator 540 may be paired with a suitable static comparison value to achieve the desired result.

Summer 550 sums a phase offset with the output of phase accumulator 540, and provides the result to sin wave generator 560. Sin wave generator 560 is shown as implementing a CORDIC algorithm, although this is not a limitation of the present invention. For example, a look up table may be used to map phase values to sin values. The result is the fast-scan oscillation drive signal on node 411.

Fast-scan oscillation drive circuit 500 implements a digital phase lock loop to track the resonant frequency of the fast-scan mirror motion. In some embodiments, an analog phase lock loop is employed.

Figure 6:
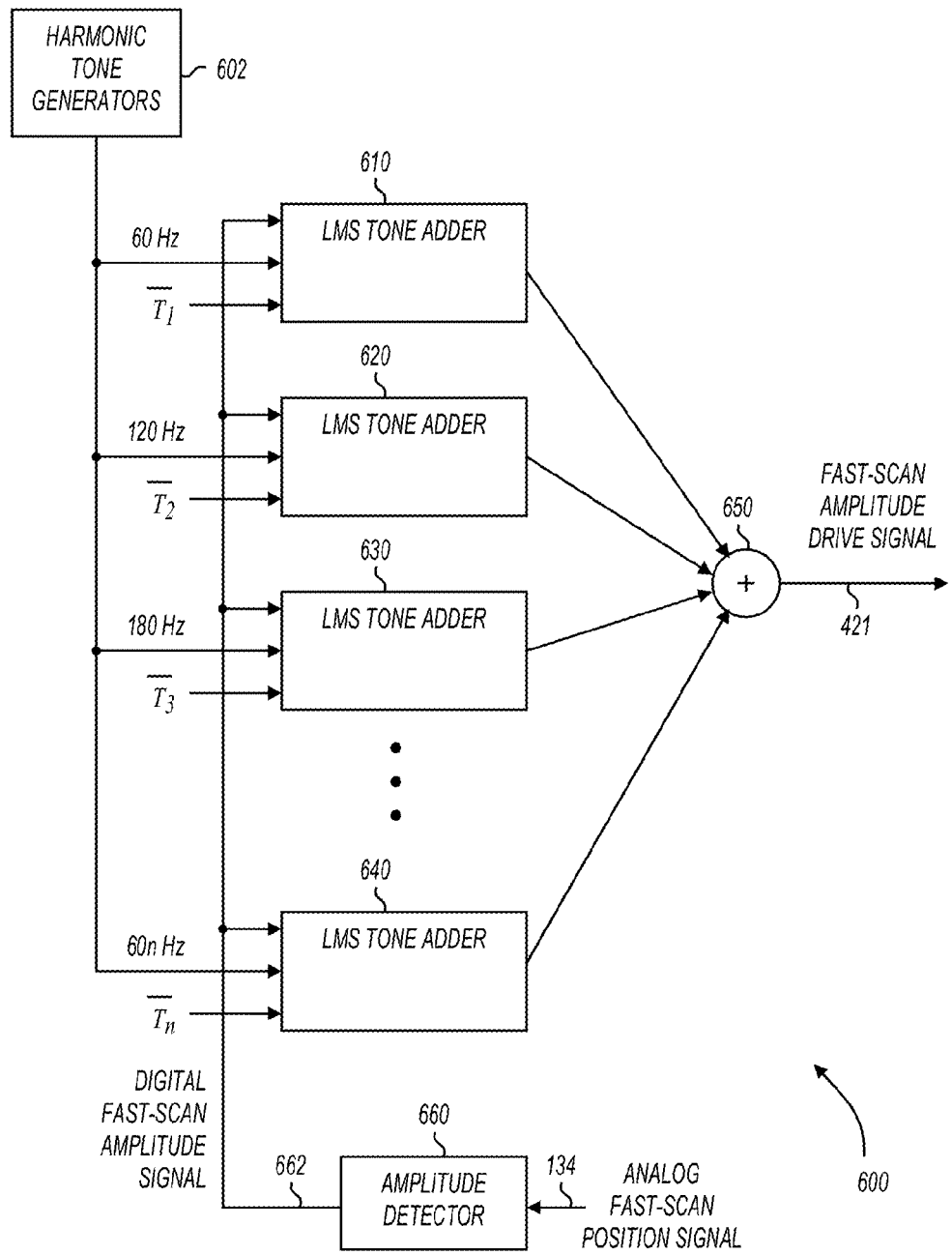
FIG. 6 shows a fast-scan amplitude drive circuit.

FIG. 6 shows a fast-scan amplitude drive circuit. Fast-scan amplitude drive circuit 600 is an example circuit that may perform the function of fast-scan amplitude drive circuit 420 (FIG. 4). Fast-scan amplitude drive circuit 600 includes harmonic tone generators 602, amplitude detector 660, and least mean square (LMS) tone adders 610, 620, 630, and 640, corresponding to one tone adder for each of n tones to be summed.

Amplitude detector 660 receives the analog fast-scan position signal on node 134 and produces a digital fast-scan amplitude signal on node 662. This corresponds to receiving fast-scan deflection waveform 220 (FIG. 2) as an analog signal, and producing amplitude signal 222 (FIG. 2) as a stream of digital samples. In some embodiments, amplitude detector 660 may include an analog-to-digital converter and peak detector. In other embodiments, amplitude detector 660 may include a comparator that compares the analog fast-scan position signal with a non-zero reference value. The resulting pulse width may then be mapped to an amplitude value. The digital fast-scan amplitude signal on node 662 is provided to each of the LMS tone adders.

Harmonic tone generators 602 generate a number of harmonically related tones. The fast-scan amplitude drive signal on node 421 is constructed from weighted versions of tones at these frequencies. Multiples of 60 Hz are used in the example of FIG. 6; however this is not a limitation of the present invention.

LMS tone adder 610 (the first tone adder) receives a 60 Hz tone, the corresponding coefficient $T_1$, and the digital fast-scan amplitude signal. LMS tone adder 620 (the second tone adder) receives a 120 Hz tone, the corresponding coefficient $T_2$, and the digital fast-scan amplitude signal. LMS tone adder 630 (the third tone adder) receives a 180 Hz tone, the corresponding coefficient $T_3$, and the digital fast-scan amplitude signal. LMS tone adder 640 (the $n^{th}$ tone adder) receives a 60 n Hz tone, the corresponding coefficient $T_n$, and the digital fast-scan amplitude signal. Summer 650 sums the harmonically related signals generated by the tone adders, and produces the digital fast-scan amplitude drive signal.

In operation, each LMS tone adder compares a spectral component (harmonic of the fundamental) of the digital fast-scan amplitude signal against a target. The number of tone adders is equal to the number of signal harmonics in the fast-scan amplitude drive signal. Any number of harmonics and any number of tone adders may be included without departing from the scope of the present invention. For example, in some embodiments, ten tone adders may be utilized, and the harmonics may range from 60 Hz to 600 Hz. In other embodiments, 17 tone adders may be utilized, and the harmonics may range from 60 Hz to 1.02 kHz. The number of harmonics utilized represents a tradeoff between drive signal fidelity and implementation complexity.

The example of FIG. 6 shows a fundamental frequency of 60 Hz and harmonics thereof, although the various embodiments of the invention are not so limited. For example, a sawtooth fast-scan amplitude deflection may have a fundamental frequency other than 60 Hz, in which case the harmonic tones will be at frequencies other than at multiples of 60 Hz. Also for example, the fast-scan amplitude trajectory may be any signal that may be constructed from a sum of sinusoids.

Figure 7:
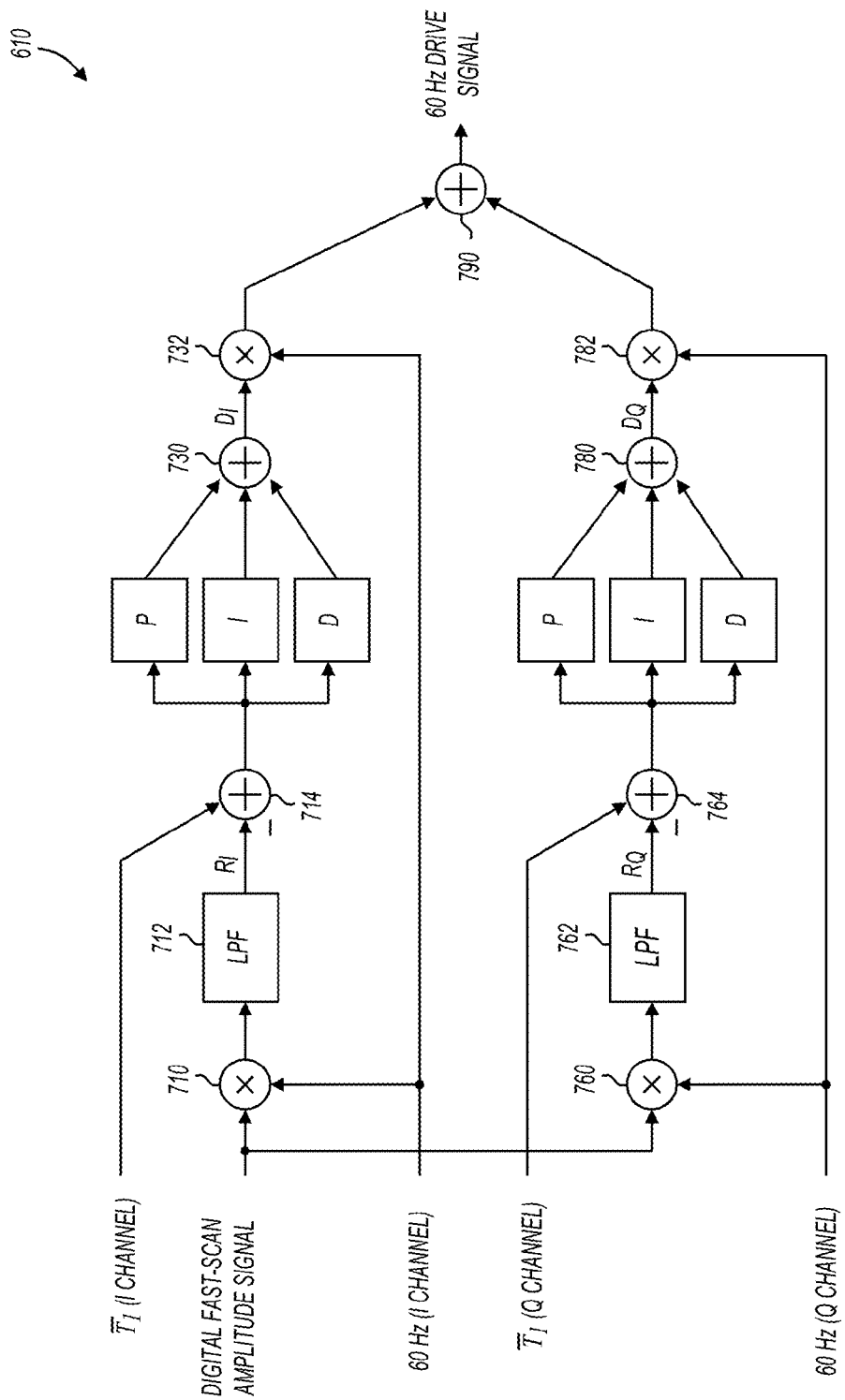
FIG. 7 shows an LMS tone adder.

FIG. 7 shows an LMS tone adder. LMS tone adder 610 includes in-phase and quadrature circuits to operate on complex signal samples. The in-phase circuit includes summers 714 and 730, multipliers 710 and 732, low pass filter (LPF) 712, and a proportional/integral/derivative (PID) controller that includes a proportional block (P), an integrator block (I), and a derivative block (D). The quadrature circuit includes summers 764 and 780, multipliers 760 and 782, low pass filter (LPF) 762, and a proportional/integral/derivative (PID) controller that includes a proportional block (P), an integrator block (I), and a derivative block (D). The outputs of the in-phase and quadrature channels are combined by summer 790 to create the harmonic output signal. FIG. 7 shows the first LMS tone adder of FIG. 6 (610). This tone adder receives a 60 Hz tone and the coefficient for the 60 Hz target, and produces the 60 Hz drive signal. Other LMS tone adders include identical functional blocks, but receive tones and targets for different harmonics.

In operation, multipliers 710 and 760 mix the fast-scan amplitude signal with in-phase and quadrature components of a 60 Hz tone, translating the signal spectrum at 60 Hz to DC. Phase information is preserved through the quadrature operation. Low pass filters 712 and 762 remove spectral energy corresponding to harmonics that were not translated to DC. For example, the cutoff frequency of low pass filters 712 and 762 may be about 20 Hz. The DC output of filters 712 and 762 represents the harmonic coefficient $\overline{R}_k$ that is "returned" from the scanning mirror. The return harmonic coefficients are represented as $$\overline{R}_n = R_R + iR_I \quad (2)$$

where n is the harmonic number, $\overline{R}_n$ is complex, $R_R$ is real, and $iR_I$ is imaginary. These DC values are compared with (subtracted from) the target values, with the differences being the error signals which are applied to the PID controllers. The PID controllers operate to drive the in-phase and quadrature errors to zero. The output of the PID blocks are summed at 730 and 780 to form a complex harmonic drive coefficient represented as $$\overline{D}_n = D_R + iD_I, \quad (3)$$

where n is the harmonic number, $\overline{D}_n$ is complex, $D_R$ is real, and $iD_I$ is imaginary. The harmonic drive coefficient is mixed back up to 60 Hz by multipliers 732 and 782 to generate the in-phase and quadrature components of the 60 Hz drive signal, which are combined at 790.

In some embodiments, LMS tone adder 610 does not utilize the proportional blocks (P) or the derivative blocks (D). In these embodiments, the integrator blocks (I) integrate the error terms to arrive at the output signals.

Figure 8:
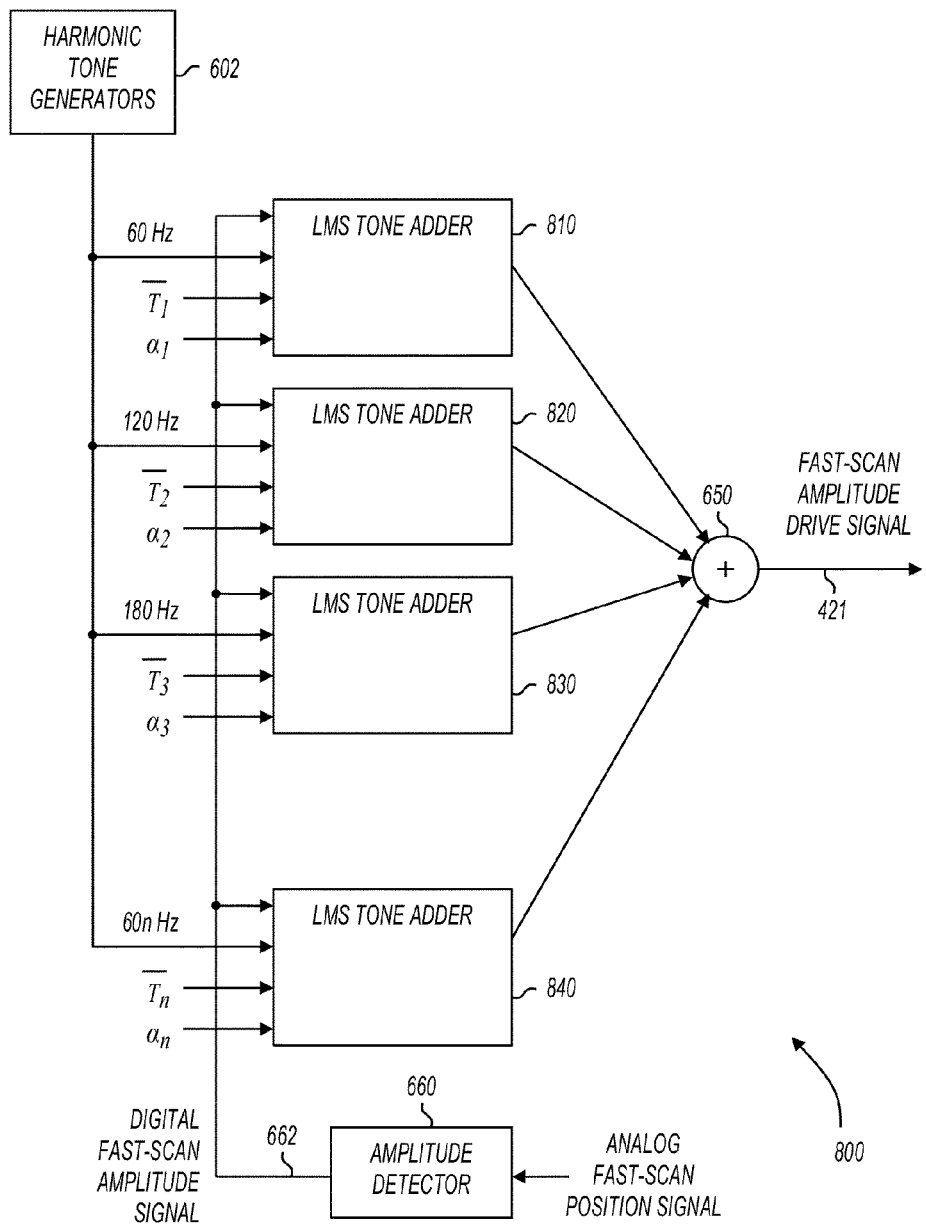
FIG. 8 shows a fast-scan amplitude drive circuit using a harmonic coefficient weighting array.

FIG. 8 shows a fast-scan amplitude drive circuit using a harmonic coefficient weighting array. Fast-scan amplitude drive circuit 800 is an example circuit that may perform the function of fast-scan amplitude drive circuit 420 (FIG. 4). Fast-scan amplitude drive circuit 800 includes harmonic tone generators 602, amplitude detector 660, and LMS tone adders 810, 820, 830, and 840, and summer 650. Harmonic tone generators 602, amplitude detector 660, and summer 650 are described above with reference to FIG. 6. LMS tone adders 810, 820, 830, and 840 correspond to the LMS tone adders of FIG. 6 except that LMS tone adders 810, 820, 830, and 840 receive a harmonic coefficient weighting array $\alpha_k$.

Similar to fast-scan amplitude drive circuit 600 in FIG. 6, fast-scan amplitude drive circuit 800 receives the analog fast-scan position signal and harmonic coefficient targets, $T_n$, and produces a digital fast-scan amplitude drive signal. Fast-scan amplitude drive circuit 800 differs from fast-scan amplitude drive circuit 600, in that circuit 800 also receives a harmonic coefficient weighting array to provide different "learning rates" for each harmonic coefficient. Alpha, $\alpha_k$, is the weighting array that provides appropriate magnitude and phase scaling (vector direction) for successive reduction of the error quantity.

In some embodiments, the weighting array is the inverse of the mirror gain (transfer function) normalized to one at the primary frequency (60 Hz). One or more mirrors can be characterized, and the weighting array is determined from the measured transfer function. Alternatively, the linear transfer function of the mirror can be measured and learned at device startup or during operation of the device. For example, assume that a measured mirror gain (see FIG. 6) at 60 Hz intervals for 17 harmonics is as follows:

MirrorGain=[0.0562, 0.0595, 0.0630, 0.0653, 0.0668, 0.0724 0.0812, 0.0912, 0.1122, 0.1496, 0.2511, 1.0, 1.0, 0.2511 0.1412, 0.0944, 0.0668]

where the first entry of MirrorGain corresponds to the gain at 60 Hz and the last entry of Mirror Gain corresponds to the gain at 1.02 kHz. These are shown as real coefficients (magnitude only), but they can be complex values (magnitude and phase). The weighting array $\alpha_k$ (Alpha(k)) can be determined using the following algorithm:

$$\text{Alpha}'(k) = \frac{\text{MirrorGain}(k)}{\text{MirrorGain}(1)} \text{ // Normalize to the first harmonic}$$

$$\alpha_k = \frac{1}{\text{Alpha}'(k)} \text{ //}$$

Inverse of the linear gain at each discrete harmonic (frequency)

It should be noted that the Alpha weighting does not necessarily have to conform to the MEMS gain properties. The MEMS transfer function can be modified by a closed loop feedback system and the composite gain of the combined system can be used to compute $\alpha_k$ (Alpha(k)).

Figure 9:
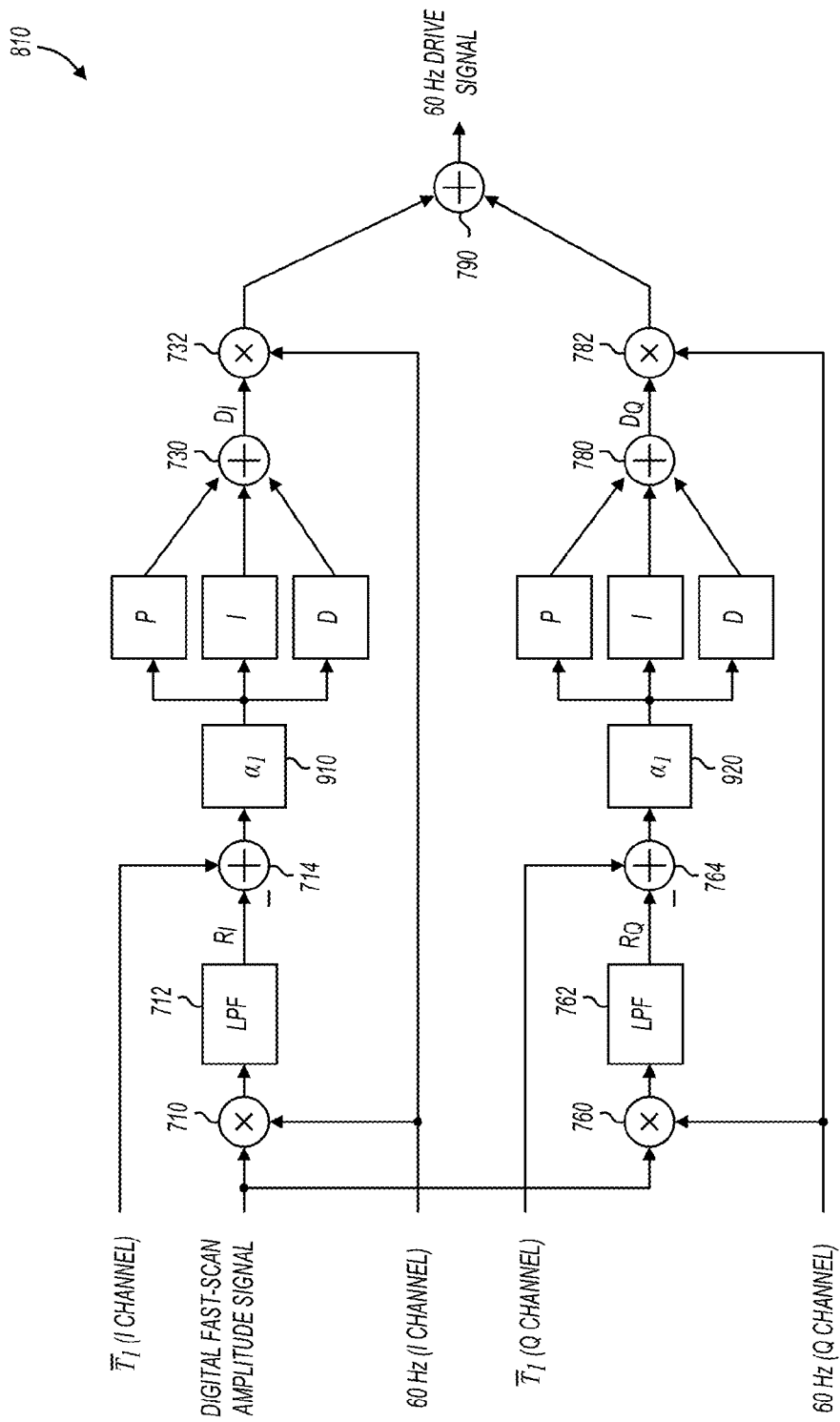
FIG. 9 shows an LMS tone adder using harmonic coefficient weighting.

FIG. 9 shows an LMS tone adder using harmonic coefficient weighting. LMS tone adder 810 includes all of the components shown in FIG. 7. In addition, LMS tone adder 810 shows coefficient weighting blocks 910 and 920. Coefficient weighting blocks 910 and 920 provide scaling to the error signal, thereby allowing each LMS tone adder to have a different learning rate for the corresponding drive coefficient.

Figure 10:
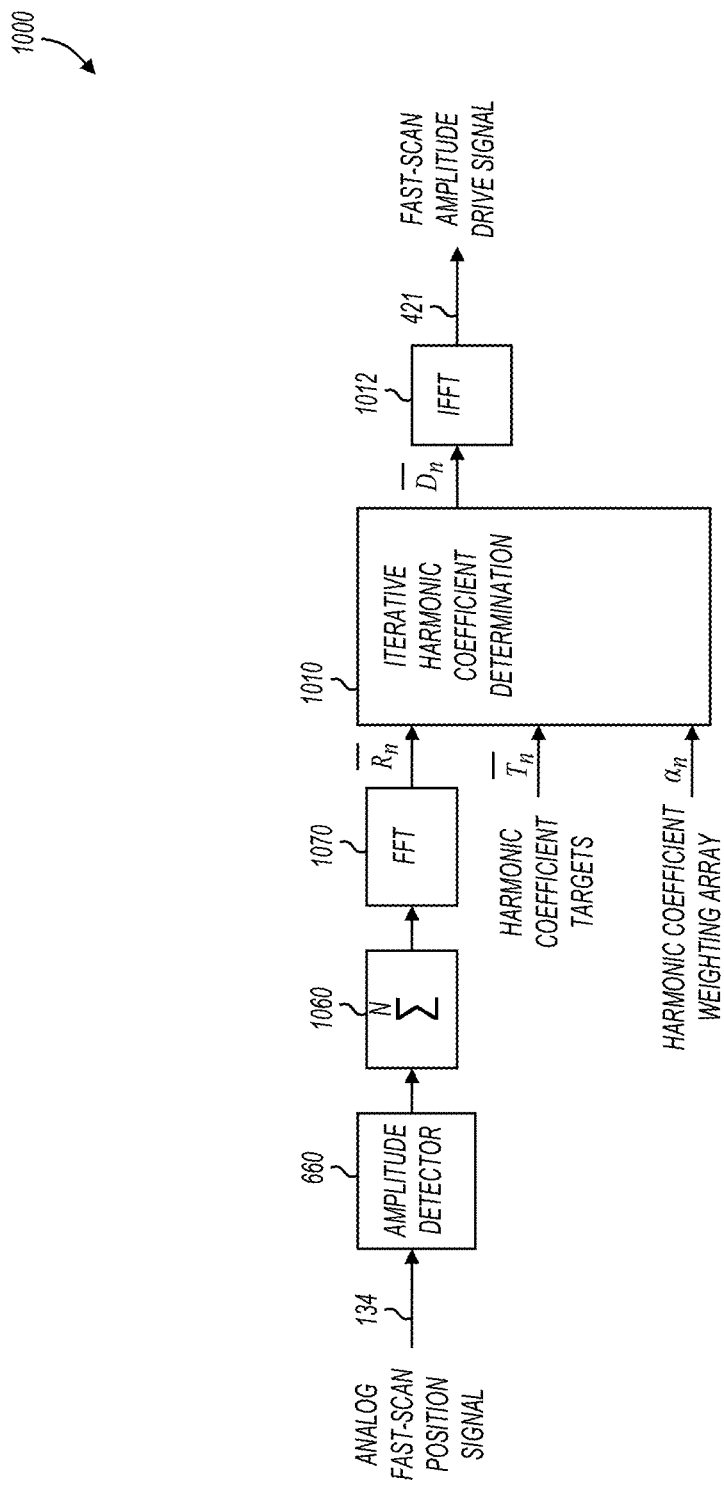
FIG. 10 shows a fast-scan amplitude drive circuit that iteratively determines harmonic coefficients using a harmonic coefficient weighting array.

FIG. 10 shows a fast-scan amplitude drive circuit that iteratively determines harmonic coefficients using a harmonic coefficient weighting array. Fast-scan amplitude drive circuit 1000 is an example circuit that may perform the function of fast-scan amplitude drive circuit 420 (FIG. 4). Fast-scan amplitude drive circuit 1000 includes iterative harmonic coefficient determination block 1010, amplitude detector 660, summing buffer 1060, fast Fourier transform (FFT) block 1070, and inverse fast Fourier transform (IFFT) block 1012.

In operation, iterative harmonic coefficient determination block determines harmonic drive coefficients represented as $$\overline{D}_n = D_R + iD_I,$$

where n is the harmonic number, $\overline{D}_n$ is complex, $D_R$ is real, and $iD_I$ is imaginary. See equation (3), above. Inverse fast Fourier transform (IFFT) block 1012 produces a time domain fast-scan amplitude drive signal from the harmonic drive coefficients.

Amplitude detector 660 receives the analog fast-scan position signal on node 134 and produces a digital fast-scan amplitude signal. Amplitude detector 660 is further described above with reference to FIG. 6. Summing buffer 1060 sums (or averages) the fast-scan amplitude waveform over N cycles to increase the signal-to-noise ration (SNR). The fast-scan amplitude waveform can be averaged over any number of cycles without departing from the scope of the present invention. The averaged fast-scan amplitude waveform is processed by FFT 1070 to yield the return harmonic coefficients represented as $$\overline{R}_n = R_R + iR_I,$$

where n is the harmonic number, $\overline{R}_n$ is complex, $R_R$ is real, and $iR_I$ is imaginary. See equation (2), above. Iterative harmonic coefficient determination block 1010 receives the return harmonic coefficients $\overline{R}_n$ as well as harmonic coefficient targets and a harmonic coefficient weighting array $\alpha_n$. The harmonic coefficient targets are represented as $$\overline{T}_n = T_R + iT_I,$$

where n is the harmonic number, $\overline{T}_n$ is complex, $T_R$ is the real, and $iT_I$ is imaginary. See equation (1), above. Iterative harmonic coefficient determination block 1010 determines the error in the return coefficients as $$\overline{E}_n = \overline{T}_n - \overline{R}_n, \quad (4)$$

and then updates the harmonic drive coefficients as $$\overline{D}_n^{k+1} = \overline{D}_n^k + \beta \alpha_n \overline{E}_n^k, \quad (5)$$

where the superscript k in equation (5) refers the $k^{th}$ iteration, the k+1 superscript refers to the next iteration, β is a global gain value (learning rate) in the range of 0 to 1. Alpha, $\alpha_n$, is the static weighting array that provides appropriate magnitude and phase scaling (vector direction) for successive reduction of the error quantity $E_n$.

In some embodiments, the weighting array is the inverse of the mirror gain (transfer function) normalized to one at the primary frequency (60 Hz). One or more mirrors can be characterized, and the weighting array is determined from the measured transfer function. Alternatively, the linear transfer function of the mirror can be measured and learned at device startup or during operation of the device. For example, assume that a measured mirror gain at 60 Hz intervals for 17 harmonics is as follows:

MirrorGain=[0.0562, 0.0595, 0.0630, 0.0653, 0.0668, 0.0724 0.0812, 0.0912, 0.1122, 0.1496, 0.2511, 1.0, 1.0, 0.2511 0.1412, 0.0944, 0.0668]

where the first entry of MirrorGain corresponds to the gain at 60 Hz and the last entry of Mirror Gain corresponds to the gain at 1.02 kHz. These are shown as real coefficients (magnitude only), but they can be complex values (magnitude and phase). The weighting array $\alpha_n$ (Alpha(n)) can be determined using the following algorithm:

$$\text{Alpha}'(n) = \frac{MirrorGain(n)}{MirrorGain(1)} \quad // \text{Normalize to the first harmonic}$$

$$\alpha_n = \frac{1}{\text{Alpha}'(n)} //$$

Inverse of the linear gain at each discrete harmonic (frequency)

It should be noted that the Alpha weighting does not necessarily have to conform to the MEMS gain properties. The MEMS transfer function can be modified by a closed loop feedback system and the composite gain of the combined system can be used to compute $\alpha_n$ (Alpha(n)).

The harmonic drive coefficient update shown in equation (5) and the operation of IFFT 1012 can be performed in accordance with the following pseudocode, where Return(n) is $\overline{R}_n^k$, Dold(n) is $\overline{D}_n^k$, Dnew(n) is $\overline{D}_n^{k+1}$, Targ(n) is $T_n$, and Timepts is an integer corresponding to the number of points in the ramp waveform:

```
Loop until ramp is smooth (linear)          // Main Loop
    for n=1:num_tune_harmonics              // 17 harmonics in this example
        Dnew(n)=Dold(n) + (Beta*Alpha(n)*(Targ(n)-Return(n)));
                                            // Primary iterative equation (5)
    end for
    DnewAmp=abs(Dnew);           // absolute value of each drive coefficient
    Dnewphz=atan(imag(Dnew),real(Dnew));   // phase of each drive coefficient
    For tt=1:(timepts);   // Construct time domain ramp from new coefficients
        time(tt)=tt/(timepts);     //normalized to one period
        Votemp=0;
        for n=1:num_tune_harmonics          //sum of harmonics in time domain
            Votemp=Votemp+(DnewAmp(n)*sin((n*w*time(tt))+Dnewphz(n)));
        end for
        Vo(tt)=Votemp;
    end for
    Voltdrive=Vo;                           //array of time domain Ramp Drive
    Dold=Dnew
end loop                                    // Main Loop
```

Figure 11:
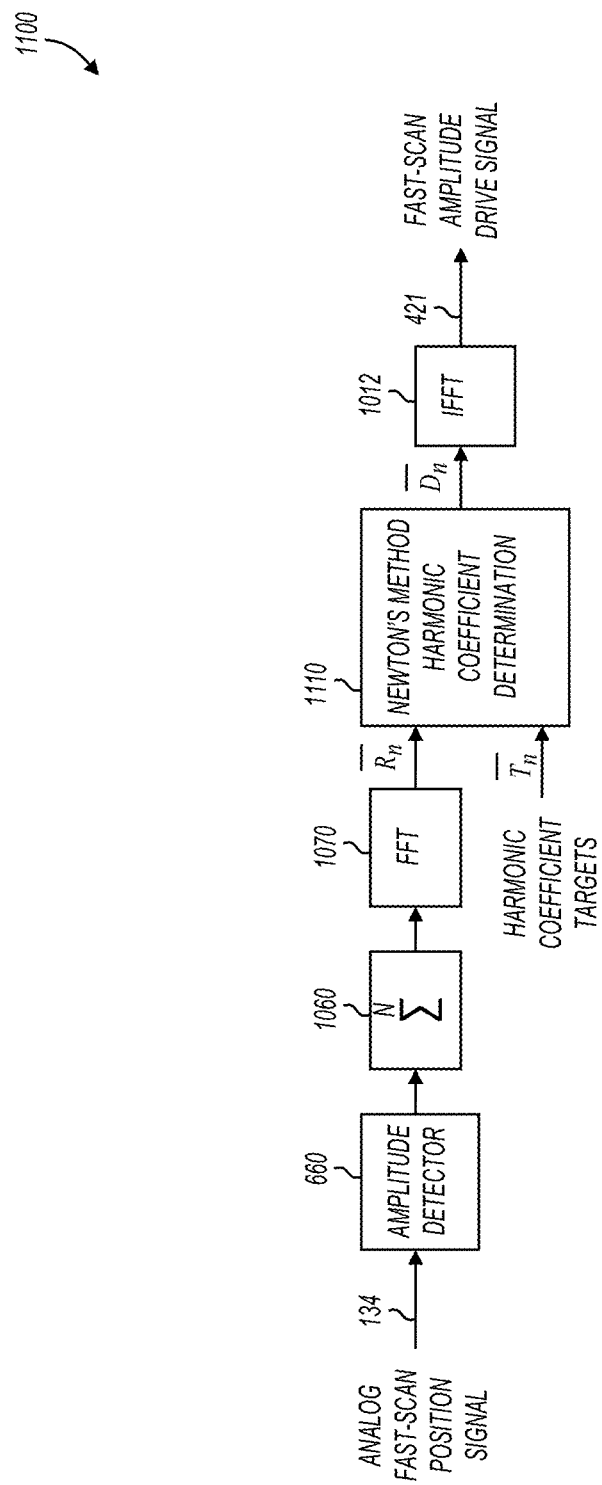
FIG. 11 shows a fast-scan amplitude drive circuit that iteratively determines harmonic coefficients using an approximation of Newton's method.

FIG. 11 shows a fast-scan amplitude drive circuit that iteratively determines harmonic coefficients using an approximation of Newton's method. Fast-scan amplitude drive circuit 1100 is an example circuit that may perform the function of fast-scan amplitude drive circuit 420 (FIG. 4). Fast-scan amplitude drive circuit 1100 includes amplitude detector 660, summing buffer 1060, fast Fourier transform (FFT) block 1070, and inverse fast Fourier transform (IFFT) block 1012, all of which are described above with respect to FIG. 10.

Fast-scan amplitude drive circuit 1100 also includes Newton's method harmonic coefficient determination block 1110.

Similar to block 1010 in FIG. 10, block 1110 receives the return harmonic coefficients $\overline{R}_n$ and targets $T_n$, and produces harmonic drive coefficients $\overline{D}_n$. The Newton's method block 1110 differs from block 1010, in that block 1110 does not receive a weighting array. Instead, block 1110 adaptively modifies the learning rate of each harmonic coefficient as explained below.

In numerical analysis, Newton's method is useful for finding successively better approximations to the zeros (or roots) of a real-valued function. As applied to the current problem, Newton's method can be shown as:

$$\overline{D}_n^{k+1} = \overline{D}_n^k - \left[\frac{d\overline{E}_n^k}{d\overline{D}_n^k}\right]^{-1} \overline{E}_n^k. \quad (6)$$

A discrete approximation to Newton's method as applied to the current problem can be shown as $$\overline{D}_n^{k+1} \approx \overline{D}_n^k + \left[\frac{\overline{D}_n^k - \overline{D}_n^{k-1}}{\overline{R}_n^k - \overline{R}_n^{k-1}}\right] \overline{E}_n^k, \quad (7)$$

where $\Delta D_n^k = \overline{D}_n^k - \overline{D}_n^{k-1}$ represents the change in drive on previous iteration, and $$G_n^k = \left[\frac{\overline{D}_n^k - \overline{D}_n^{k-1}}{\overline{R}_n^k - \overline{R}_n^{k-1}}\right] \quad (8)$$

represents the gain (weighting) on the $k^{th}$ iteration for $n^{th}$ harmonic. Note that $G_n^k$ in equation 7 takes the place of $\alpha_n$ (Alpha) in equation (5), and also that $G_n^k$ is a function of the previous changes in drive coefficients as well as previous changes in return coefficients. Accordingly, the weighting for each harmonic coefficient is adaptive in embodiments represented by FIG. 11, whereas the weighting for each harmonic coefficient is fixed in embodiments represented by FIG. 10. In some embodiments, both the fixed Alpha values and $G_n^k$ are used to compute new weighting coefficients at each iteration.

The following algorithm demonstrates use of the discrete approximation of Newton's method during each iteration:

```
for n=num_tune_harmonics
//shift phase of each harmonic so that drive waveform is in phase with return R_n^k = R_n^k e^{i(φ_D^{n=0,k} - φ_R^{n=0,k})}

//compute error and magnitude of error
E_n^k = T_n^k - R_n^k

|E_n^k| = √(E_n^k E_n^{k*})

//compute magnitude of return and old delta D

|R_n^k| = √(R_n^k R_n^{k*})

|ΔD_n^k| = √(ΔD_n^k ΔD_n^{k*})

if error is less than one bit
    //error has converged, so set delta drive to zero and
    //set the new gain to the old gain
    ΔD_n^{k+1} = 0
    G_n^{k+1} = G_n^k
else if the old delta drive is zero and the error is large
    //use the stored gain to update the new drive
    ΔD_n^{k+1} = G_n^k E_n^k
    D_n^{k+1} = D_n^k + ΔD_n^{k+1}
    G_n^{k+1} = G_n^k
else if the old delta drive is not zero and the return is zero
    //increase the old drive by a factor of two and store the old gain
    coefficient
    ΔD_n^{k+1} = 2D_n^k
    D_n^{k+1} = D_n^k + ΔD_n^{k+1}
    G_n^{k+1} = G_n^k
Else
    //no exceptions, so perform the Newton's iteration G_n^{k+1} = (D_n^k - D_n^{k-1}) / (R_n^k - R_n^{k-1})

ΔD_n^{k+1} = G_n^{k+1} E_n^k
    D_n^{k+1} = D_n^k + ΔD_n^{k+1}
end for
```

Iterations may be performed on a periodic basis. For example, the algorithm above may be performed once per second or once per many seconds.

Figure 12:
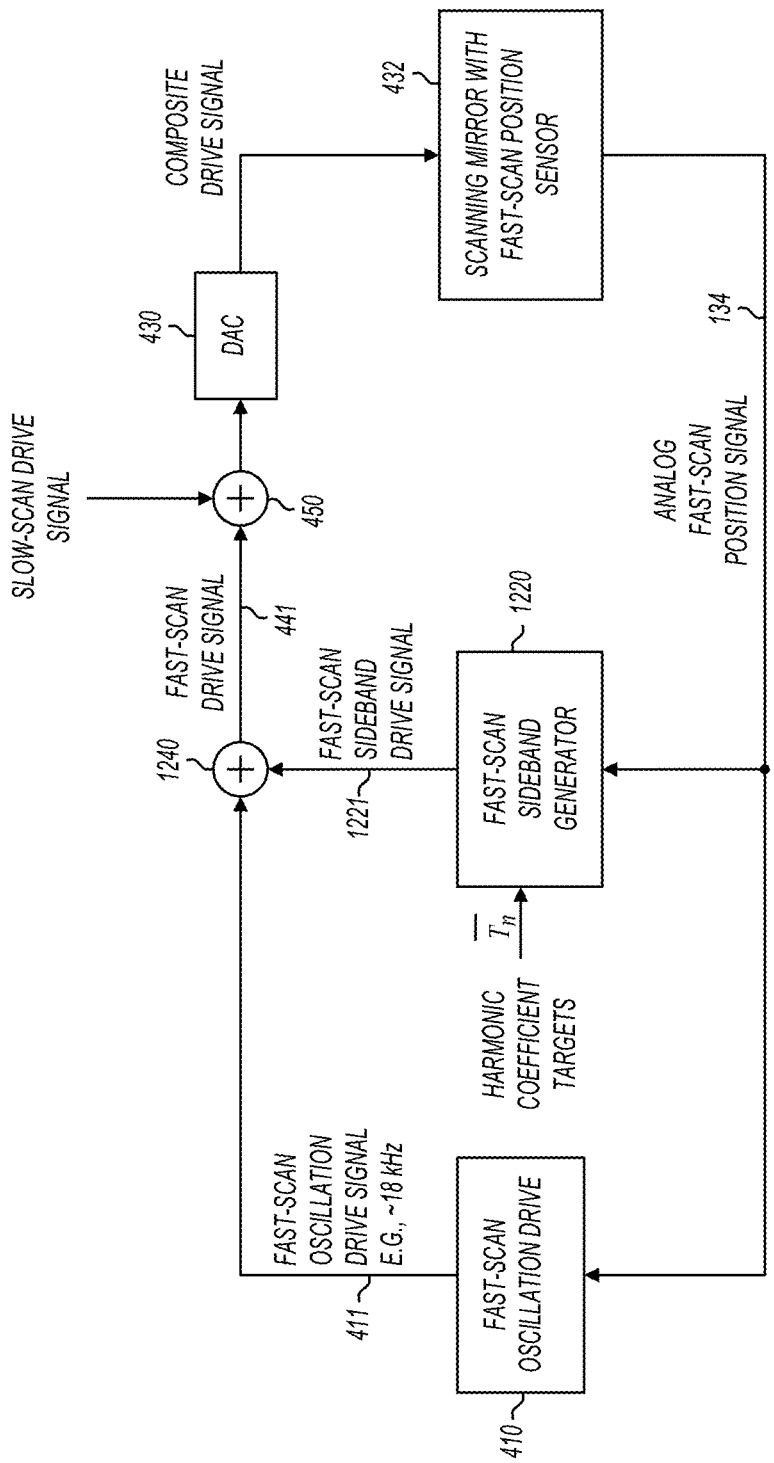
FIG. 12 shows a scanning mirror fast-scan control loop with a fast-scan sideband generator circuit.

FIG. 12 shows a scanning mirror fast-scan control loop with a fast-scan sideband generator circuit. The fast-scan control loop shown in FIG. 12 is similar to that shown in FIG. 4 with the exception of fast-scan sideband generator 1220 and summer 1240. In operation, fast-scan sideband generator 1220 generates a fast-scan sideband drive signal on node 1221 that corresponds to the sidebands present on the drive signal to achieve the desired amplitude drive. Summer 1240 sums the fast-scan oscillation drive signal on node 411 with the fast-scan sideband drive signal on node 1221 to produce the fast-scan drive signal on node 441. Fast-scan sideband generator 1220 receives the harmonic coefficient targets, $T_n$, which in this case represent the targets for the signal sidebands. In operation, fast-scan sideband generator 1220 modifies the fast-scan sideband drive signal on node 1221 until the sidebands present in the analog fast-scan position signal closely match the sidebands specified by the harmonic coefficient targets, $T_n$.

Figure 13:
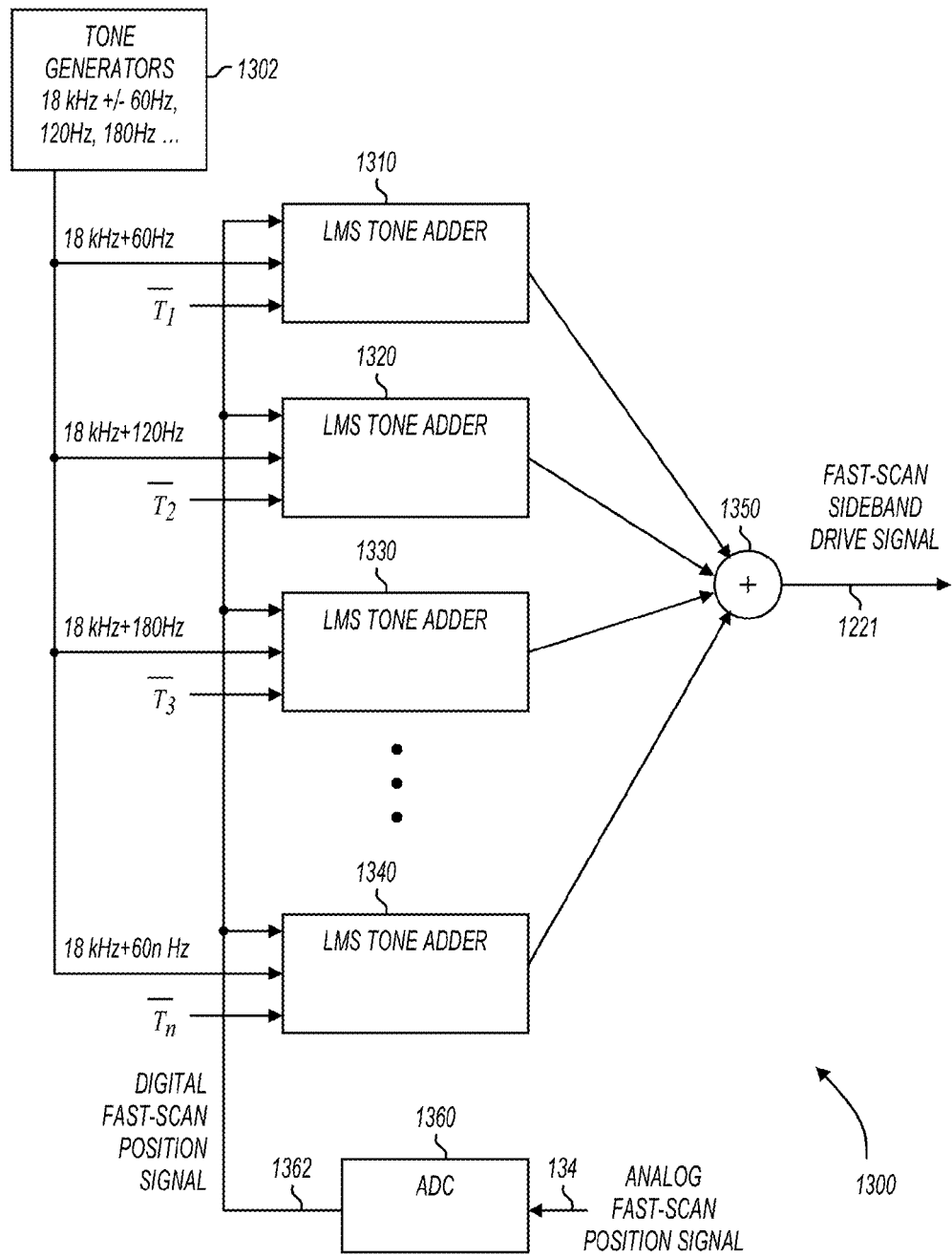
FIG. 13 shows a fast-scan sideband generator circuit.

FIG. 13 shows a fast-scan sideband generator. Fast-scan sideband generator 1300 is an example circuit that may perform the function of fast-scan amplitude drive circuit 1220 (FIG. 12). Fast-scan sideband generator 1300 includes tone generators 1302, analog-to-digital converter (ADC) 1360, and LMS tone adders 1310, 1320, 1330, and 1340, corresponding to one tone adder for each of n tones to be summed.

ADC 1360 receives the analog fast-scan position signal on node 134 and produces a digital fast-scan position signal on node 1362. The digital fast-scan position signal on node 1362 is provided to each of the LMS tone adders. This is in contrast to the circuits shown in FIGS. 6 and 8 in which each of the LMS tone adders receives a digital fast-scan amplitude signal.

Tone generators 1302 generate a number of tones related to the fast scan resonant frequency. The fast-scan sideband drive signal on node 1221 is constructed from weighted versions of tones at these frequencies. The sidebands are centered at the fast-scan resonant frequency (18 kHz in this example), and are multiples of the fundamental frequency of the fast-scan amplitude signal (60 Hz in this example). Accordingly, harmonic tone generators 1302 produce tones at 18 kHz+/60 Hz, 18 kHz+/120 Hz, 18 kHz+/180 Hz, etc.

LMS tone adder 1310 (the first tone adder) receives a 18.060 kHz tone, the corresponding coefficient $T_1$, and the digital fast-scan position signal. LMS tone adder 1320 (the second tone adder) receives a 18.120 kHz tone, the corresponding coefficient $T_2$, and the digital fast-scan position signal. LMS tone adder 1330 (the third tone adder) receives a 18.180 kHz tone, the corresponding coefficient $T_3$, and the digital fast-scan position signal. LMS tone adder 1340 (the $n^{th}$ tone adder) receives a 60 n Hz tone, the corresponding coefficient $T_n$, and the digital fast-scan position signal. Summer 1350 sums the signals generated by the tone adders, and produces the digital fast-scan amplitude drive signal. For simplicity, FIG. 13 only shows LMS tone adder receiving the upper side bands. In practice, an equal number of additional LMS tone adders are present receiving the corresponding lower sidebands. Summer 1350 sums both the lower and upper sidebands when producing the fast-scan sideband drive signal on nod 1221.

In operation, each LMS tone adder compares a sideband of the fast-scan position signal against a target. The number of tone adders is equal to the number of sidebands processed when generating the fast-scan sideband drive signal. Any number of sidebands and any number of tone adders may be included without departing from the scope of the present invention. For example, in some embodiments, ten tone adders may be utilized, and the sidebands may range from 17.700 kHz to 18.300 kHz. In other embodiments, more tone adders may be utilized. The number of sidebands utilized represents a tradeoff between drive signal fidelity and implementation complexity.

The example of FIG. 13 shows sidebands at harmonics of 60 Hz, although the various embodiments of the invention are not so limited. For example, a sawtooth fast-scan amplitude deflection may have a fundamental frequency other than 60 Hz, in which case the sidebands will be at frequencies other than at multiples of 60 Hz.

Each of LMS tone adders 1310, 1320, 1330, and 1340 may be implemented as any of the previously described tone adders. For example, the tone adders may be implemented as tone adder 610 (FIG. 7), or tone adder 810 (FIG. 9).

The functional blocks shown in FIGS. 4-13 may be implemented in any manner without departing from the scope of the present invention. For example, any combination of hardware and/or software may be utilized, as well as any level of integration. In some embodiments, a complete hardware solution is implemented. For example, one or more application specific integrated circuits (ASIC) or field programmable gate arrays (FPGA) may implement most or all of the blocks shown.

Figure 14:
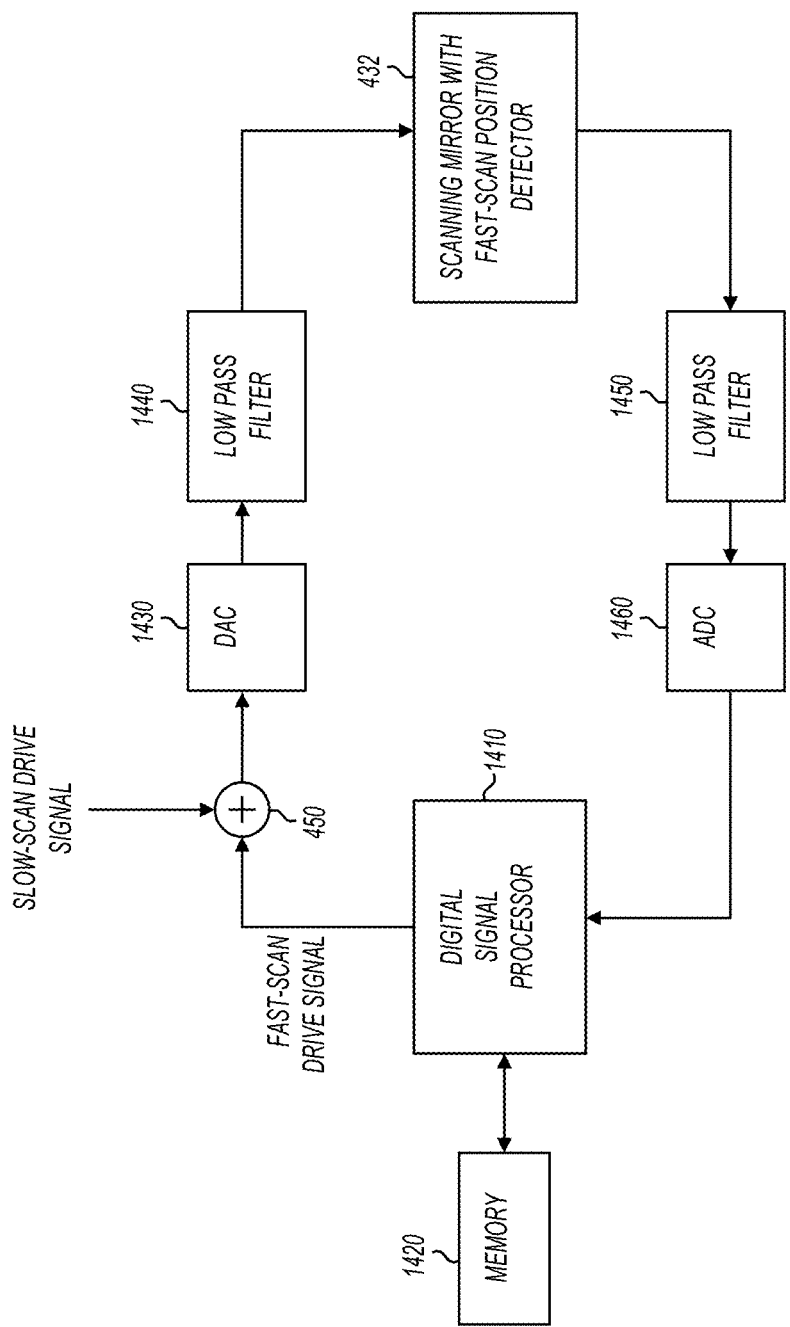
FIG. 14 shows a scanning mirror control loop that includes a digital signal processor.

In other embodiments, a processor executes instructions to perform the actions associated with FIGS. 4-13. For example, a digital signal processor (DSP) may be employed. FIG. 14 shows a fast-scan control loop that includes a digital signal processor (DSP), memory 1420 ADC 1460, DAC 1430, low pass filters 1440 and 1450, and scanning mirror 432. DSP 1410 may be any type of processor capable of performing the actions described herein. For example, DSP 1410 may be a commercially available processor or may be a custom processor. Further, DSP 1410 may be a standalone integrated circuit or may be a "core" that is included in an ASIC.

DSP 1410 receives digitized samples from ADC 1460 and provides digital data for fast-scan drive signal to DAC 1430. In dual axis mirror embodiments, the fast-scan drive signal is first summed with the slow-scan drive signal at summer 450. In some embodiments, DSP 1410 performs the LMS harmonic control functions according to the embodiments shown in FIG. 6, 8, or 13. Specifically, DSP 1410 may or may not use a fixed weighting array to provide different learning rates for each harmonic coefficient, where each harmonic coefficient represents either a component of an amplitude drive signal or a component of a sideband drive signal. In other embodiments, DSP 1410 also performs the fast-scan oscillation drive functions shown in, and described with reference to, FIGS. 4, 5, and 12.

Memory 1320 is a computer-readable medium upon which instructions are stored. For example, memory 1420 may be a volatile memory such as static or dynamic random access memory (SRAM or DRAM) or may be non-volatile memory such as FLASH memory. In some embodiments, DSP 1410 and memory 1420 are included in a common integrated circuit such as an ASIC. Memory 1420 may also be a medium suitable for distribution such as disk (hard, soft, compact, or otherwise) or server with downloadable files.

DSP 1410 accesses instructions from memory 1420 and performs various method embodiments of the present invention. For example, any of the LMS harmonic control embodiments may be performed by DSP 1410. In addition, DSP 1410 may characterize the response of scanning mirror 732 as described above with reference to the MirrorGain array.

Although DSP 1410 is shown only generating the fast scan drive signals, this is not a limitation of the present invention. For example, in some embodiments, DSP 1410 determines the slow scan and fast scan drive signals and sums them internally.

Figure 15:
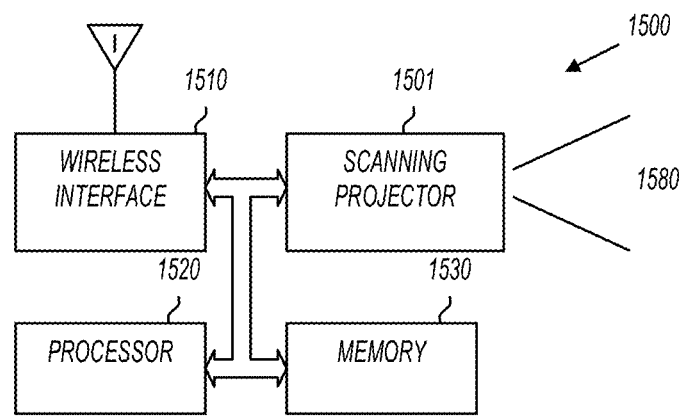
FIG. 15 shows a block diagram of a mobile device in accordance with various embodiments of the present invention.

FIG. 15 shows a block diagram of a mobile device in accordance with various embodiments of the present invention. As shown in FIG. 15, mobile device 1500 includes wireless interface 1510, processor 1520, memory 1530, and scanning projector 1501. Scanning projector 1501 may be any of the projection embodiments described with reference to previous figures. For example, scanning projector 1501 may be a scanning projector with a non-uniform scan angle amplitude in the fast-scan dimension. In some embodiments, scanning projector 1501 includes LMS tone adders, or iterative circuitry to learn harmonic coefficients that produce the desired fast-scan amplitude variations.

Scanning projector 1501 may receive image data from any image source. For example, in some embodiments, scanning projector 1501 includes memory that holds still images. In other embodiments, scanning projector 1501 includes memory that includes video images. In still further embodiments, scanning projector 1501 displays imagery received from external sources such as connectors, wireless interface 1510, or the like.

Wireless interface 1510 may include any wireless transmission and/or reception capabilities. For example, in some embodiments, wireless interface 1510 includes a network interface card (NIC) capable of communicating over a wireless network. Also for example, in some embodiments, wireless interface 1510 may include cellular telephone capabilities. In still further embodiments, wireless interface 1510 may include a global positioning system (GPS) receiver. One skilled in the art will understand that wireless interface 1510 may include any type of wireless communications capability without departing from the scope of the present invention.

Processor 1520 may be any type of processor capable of communicating with the various components in mobile device 1500. For example, processor 1520 may be an embedded processor available from application specific integrated circuit (ASIC) vendors, or may be a commercially available microprocessor. In some embodiments, processor 1520 provides image or video data to scanning projector 1501. The image or video data may be retrieved from wireless interface 1510 or may be derived from data retrieved from wireless interface 1510. For example, through processor 1520, scanning projector 1501 may display images or video received directly from wireless interface 1510. Also for example, processor 1520 may provide overlays to add to images and/or video received from wireless interface 1510, or may alter stored imagery based on data received from wireless interface 1510 (e.g., modifying a map display in GPS embodiments in which wireless interface 1510 provides location coordinates).

Figure 16:
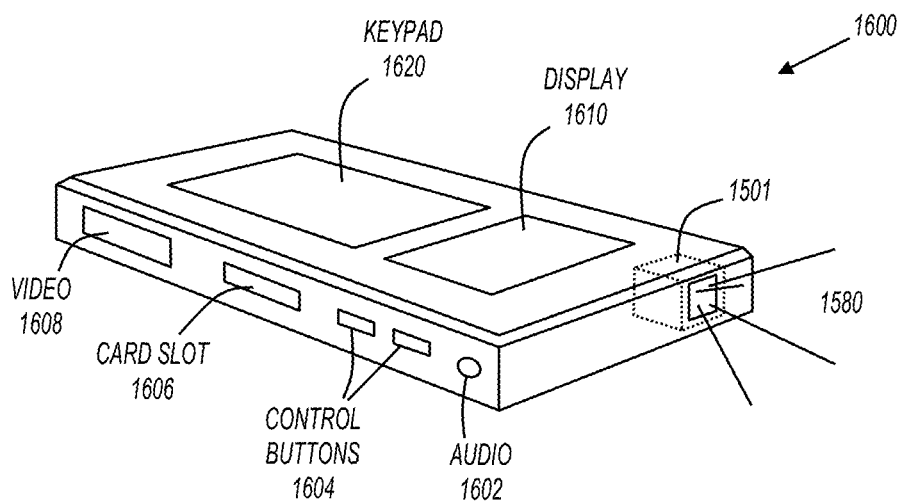
FIG. 16 shows a mobile device in accordance with various embodiments of the present invention.

FIG. 16 shows a mobile device in accordance with various embodiments of the present invention. Mobile device 1600 may be a hand held projection device with or without communications ability. For example, in some embodiments, mobile device 1600 may be a handheld projector with little or no other capabilities. Also for example, in some embodiments, mobile device 1600 may be a device usable for communications, including for example, a cellular phone, a smart phone, a personal digital assistant (PDA), a global positioning system (GPS) receiver, or the like. Further, mobile device 1600 may be connected to a larger network via a wireless (e.g., WiMax) or cellular connection, or this device can accept data messages or video content via an unregulated spectrum (e.g., WiFi) connection.

Mobile device 1600 includes scanning projector 1501 to create an image at 1580 as shown in FIG. 16. Image 1580 may be trapezoidal in shape due to the varying fast-scan amplitude as described above. Mobile device 1600 also includes many other types of circuitry; however, they are intentionally omitted from FIG. 16 for clarity.

Mobile device 1600 includes display 1610, keypad 1620, audio port 1602, control buttons 1604, card slot 1606, and audio/video (A/V) port 1608. None of these elements are essential. For example, mobile device 1600 may only include scanning projector 1501 without any of display 1610, keypad 1620, audio port 1602, control buttons 1604, card slot 1606, or A/V port 1608. Some embodiments include a subset of these elements. For example, an accessory projector product may include scanning projector 1501, control buttons 1604 and A/V port 1608.

Display 1610 may be any type of display. For example, in some embodiments, display 1610 includes a liquid crystal display (LCD) screen. Display 1610 may always display the same content as that projected or different content. For example, an accessory projector product may always display the same content, whereas a mobile phone embodiment may project one type of content while displaying different content on display 1610. Keypad 1620 may be a phone keypad or any other type of keypad.

A/V port 1608 accepts and/or transmits video and/or audio signals. For example, A/V port 1608 may be a digital port that accepts a cable suitable to carry digital audio and video data, such as a high definition media interface (HDMI) interface. Further, A/V port 1608 may include RCA jacks to accept composite inputs. Still further, A/V port 1608 may include a VGA connector to accept analog video signals. In some embodiments, mobile device 1600 may be tethered to an external signal source through A/V port 1608, and mobile device 1600 may project content accepted through A/V port 1608. In other embodiments, mobile device 1600 may be an originator of content, and A/V port 1608 is used to transmit content to a different device.

Audio port 1602 provides audio signals. For example, in some embodiments, mobile device 1600 is a media player that can store and play audio and video. In these embodiments, the video may be projected and the audio may be output at audio port 1602. In other embodiments, mobile device 1600 may be an accessory projector that receives audio and video at A/V port 1608. In these embodiments, mobile device 1600 may project the video content, and output the audio content at audio port 1602.

Mobile device 1600 also includes card slot 1606. In some embodiments, a memory card inserted in card slot 1606 may provide a source for audio to be output at audio port 1602 and/or video data to be projected. Card slot 1606 may receive any type of solid state memory device, including for example, Multimedia Memory Cards (MMCs), Memory Stick DUOS, secure digital (SD) memory cards, and Smart Media cards. The foregoing list is meant to be exemplary, and not exhaustive.

In some embodiments, the user interface components shown in FIG. 16 allow a user to specify characteristics of the fast-scan amplitude variations. For example, display 1610 may show a menu item that allows a user to select a trapezoidal projected display shape at 1580, and by doing so, mobile device modifies the harmonic coefficient targets, $T_n$.

Figure 17:
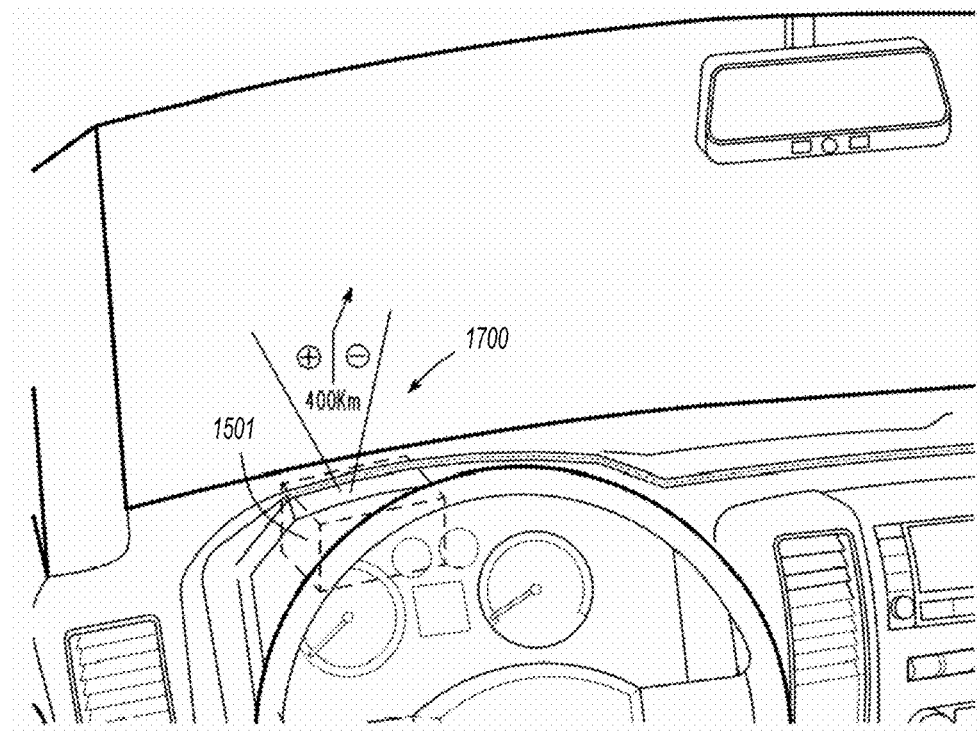
FIG. 17 shows a head-up display system in accordance with various embodiments of the invention.

FIG. 17 shows a head-up display system in accordance with various embodiments of the invention. Projector 1501 is shown mounted in a vehicle dash to project the head-up display at 1700. Although an automotive head-up display is shown in FIG. 17, this is not a limitation of the present invention. For example, various embodiments of the invention include head-up displays in avionics application, air traffic control applications, and other applications. The non-rectangular display shape capability of projector 1501 may allow the projected display to be pre-distorted to overcome any undesirable visual effects resulting from projecting on a non-uniform windshield surface.

Figure 18:
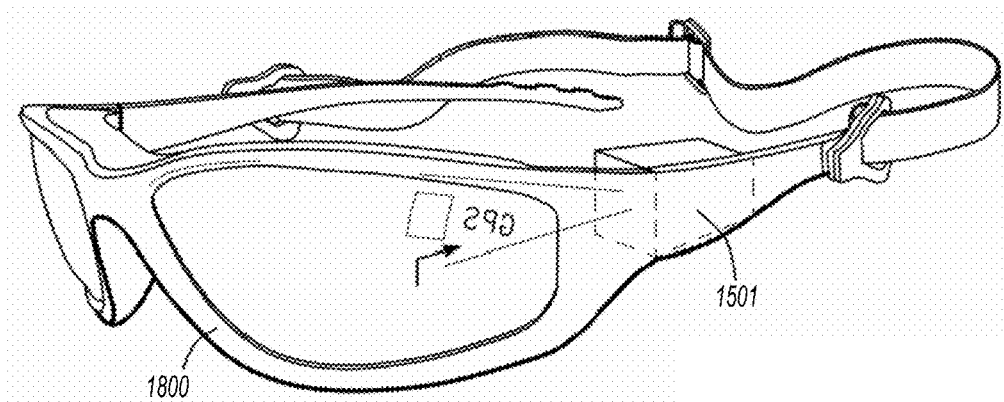
FIG. 18 shows eyewear in accordance with various embodiments of the invention.

FIG. 18 shows eyewear in accordance with various embodiments of the invention. Eyewear 1800 includes projector 1501 to project a display in the eyewear's field of view. In some embodiments, eyewear 1800 is see-through and in other embodiments, eyewear 1800 is opaque. For example, eyewear may be used in an augmented reality application in which a wearer can see the display from projector 1501 overlaid on the physical world. Also for example, eyewear may be used in a virtual reality application, in which a wearer's entire view is generated by projector 100. Although only one projector 1501 is shown in FIG. 18, this is not a limitation of the present invention. For example, in some embodiments, eyewear 1800 includes two projectors; one for each eye. The non-rectangular display shape capability of projector 1501 may allow the projected display to be pre-distorted to overcome any undesirable visual effects resulting from projecting on a non-uniform eyewear surface.

Although the present invention has been described in conjunction with certain embodiments, it is to be understood that modifications and variations may be resorted to without departing from the scope of the invention as those skilled in the art readily understand. Such modifications and variations are considered to be within the scope of the invention and the appended claims.

What is claimed is:

1. An apparatus comprising:
   a scanning mirror having a fast-scan axis and a slow-scan axis, the fast-scan axis having a position detector to provide an analog fast-scan position signal that corresponds to an angular displacement of the scanning mirror on the fast-scan axis; and
   a control loop coupled to be responsive to the analog fast-scan position signal, the control loop configured to modify a scanning mirror drive signal to produce a non-uniform fast-scan amplitude across each sweep on the slow-scan axis;
   wherein the control loop includes:

an amplitude detector that includes a peak detector to detect an amplitude of the analog fast-scan position signal and produce a digital amplitude signal; and a plurality of least mean square (LMS) tone adders to determine harmonically related components of a fast-scan amplitude drive signal in response to the digital amplitude signal.

2. The apparatus of claim 1 wherein the control loop is configured to modify the scanning mirror drive signal to produce a trapezoidal display shape.

3. The apparatus of claim 1 wherein the plurality of LMS tone adders operate to modify the harmonically related components of the fast-scan amplitude drive signal at different rates.

4. The apparatus of claim 1 wherein each of the LMS tone adders comprises a multiplier to multiply the digital amplitude signal with a tone at a harmonic frequency.

5. The apparatus of claim 4 wherein each of the LMS tone adders further comprises a summer to compare a harmonic coefficient target with an output of the multiplier.

6. The apparatus of claim 1 wherein the control loop further includes a fast-scan oscillation drive circuit to produce a fast-scan oscillation drive signal at a resonant frequency of the fast-scan axis.

7. The apparatus of claim 6 wherein the fast scan oscillation drive circuit comprises a phase lock loop circuit responsive to the analog fast-scan position signal.

8. The apparatus of claim 6 wherein the fast-scan oscillation drive circuit is configured to produce the fast-scan oscillation drive signal at substantially 18 kHz.

9. The apparatus of claim 6 further comprising a multiplier to combine the fast-scan oscillation drive signal and the fast-scan amplitude drive signal.

10. A projection apparatus comprising:

a resonant scanning mirror with at least one position sensor to sense an angular displacement of the resonant scanning mirror on a fast-scan axis, and to produce an oscillating position signal;

an amplitude detector including a peak detector to detect an amplitude of the oscillating position signal produced by the at least one position sensor; and a control loop to modify a scanning mirror drive signal to cause the amplitude of the oscillating position signal to vary substantially linearly for a finite time period, wherein the control loop comprises a plurality of least mean square (LMS) tone adders to determine harmonically related components of an amplitude drive signal in response to the amplitude of the oscillating position signal.

11. The projection apparatus of claim 10 wherein the resonant scanning mirror comprises a dual axis scanning mirror.

12. The projection apparatus of claim 11 wherein the control loop modifies the scanning mirror drive signal to create a trapezoidal display.

* * * * *